United States Patent

Ritt

(10) Patent No.: US 7,076,829 B2
(45) Date of Patent: Jul. 18, 2006

(54) FASTENING ELEMENT FOR THE WIPER ARM OF A VEHICLE WINDSHIELD WIPER

(75) Inventor: Jean-Marc Ritt, Strasbourg (FR)

(73) Assignee: Robert Bosch GmbH, Stuttgart (DE)

( * ) Notice: Subject to any disclaimer, the term of this patent is extended or adjusted under 35 U.S.C. 154(b) by 288 days.

(21) Appl. No.: 10/475,384

(22) PCT Filed: Jan. 30, 2003

(86) PCT No.: PCT/DE03/00252

§ 371 (c)(1),
(2), (4) Date: Oct. 20, 2003

(87) PCT Pub. No.: WO04/000615

PCT Pub. Date: Dec. 31, 2003

(65) Prior Publication Data

US 2004/0216261 A1 Nov. 4, 2004

(30) Foreign Application Priority Data

Jun. 21, 2002 (DE) ................................ 102 27 819

(51) Int. Cl.
*B60S 1/34* (2006.01)

(52) U.S. Cl. ......................... 15/250.351; 15/250.352; 15/250.21

(58) Field of Classification Search ........... 15/250.351, 15/250.352, 250.21, 250.23, 250.202
See application file for complete search history.

(56) References Cited

U.S. PATENT DOCUMENTS

| 3,122,770 A | * | 3/1964 | Krohm ................... 15/250.351 |
| 3,176,336 A | * | 4/1965 | Scinta ................... 15/250.351 |
| 5,652,994 A | * | 8/1997 | Egner-Walter et al. 15/250.351 |
| 6,505,377 B1 | * | 1/2003 | Merkel et al. ......... 15/250.351 |
| 6,687,949 B1 | * | 2/2004 | Zimmer ................. 15/250.351 |

FOREIGN PATENT DOCUMENTS

| DE | 33 12 011 A | 10/1983 |
| DE | 197 35 301 A | 2/1999 |
| DE | 100 20 004 A | 11/2001 |
| EP | 0 579 550 A | 1/1994 |
| EP | 0 798 184 A | 10/1997 |
| GB | 438 419 A | 6/1960 |
| GB | 2 311 338 A | 9/1997 |

* cited by examiner

*Primary Examiner*—Gary K. Graham
(74) *Attorney, Agent, or Firm*—Michael J. Striker

(57) ABSTRACT

A fastening part for a wiper arm of a vehicle wiper is disclosed, which can be driven for the pivoting motion and which has a receptacle for the articulated connection of the wiper arm (11). For the sake of economical production of a lightweight fastening part of adequate rigidity, the fastening part is embodied as a sheet-metal part (17), with a substantially flat back (171) located in the pivoting plane and two side cheeks (172, 173), protruding approximately at right angles from the back, and a transverse reinforcement (21), which braces the upper edges (172*a*, 173*a*), remote from the back, of the side cheeks (172, 173) against one another is disposed in the transition region from the side cheeks (172, 173) to the ears (18, 19), in which the articulated connection of the wiper arm (11) to the fastening part is made (FIG. 2).

5 Claims, 2 Drawing Sheets

FASTENING ELEMENT FOR THE WIPER ARM OF A VEHICLE WINDSHIELD WIPER

BACKGROUND OF THE INVENTION

The invention is based on a fastening part for a wiper arm of a vehicle wiper.

Known wipers for vehicle windows have a four-bar drive linkage and a wiper arm, which is pivotable by the drive linkage which and on its free end carries the wiper blade that is moved over the vehicle window by the pivoting motion of the wiper arm. The four-bar drive linkage has two pivot levers, which on one lever end are seated on an axle in a manner fixed against relative rotation, and also has the fastening part, acting as a coupling, which couples the two pivot levers together on their ends remote from their axle, each via a respective joint with a joint axis oriented parallel to the lever axles. One of the lever axles can be driven by means of a wiper motor, while the other lever axle is rotatably received in a support bearing. The fastening part forming the coupling is made from die-cast aluminum, and on its end toward the wiper arm it has a receptacle for the wiper arm pivotably supported therein, whose pivot axis is oriented approximately perpendicular to the joint axes and transversely to the longitudinal axis of the fastening part.

SUMMARY OF THE INVENTION

The fastening part according to the invention for a wiper arm of a vehicle wiper, has the advantage that it can be produced economically as a sheet-metal part and can be lightweight. The back of the sheet-metal part, located in the pivoting plane, assures adequate rigidity in the coupling plane of the four-bar drive linkage, and this reliably prevents the fastening part from kinking, even if the wiper blade is temporarily sluggish. The transverse reinforcement assures a uniformly high rigidity of the sheet-metal part in the region of the wiper arm receptacle, so that even sheer forces occurring in this top region of the sheet-metal part that is offset parallel from the pivoting plane of the four-bar drive linkage upon pivoting of the wiper blade cannot cause any torsion or bending or the sheet-metal part.

In a preferred embodiment of the invention, the transverse reinforcement comprises a first tab, which is bent over approximately parallel to the back at the upper edge of one side cheek, a second tab, which bent over from the upper edge of the other side cheek until it rests on the first tab. The second tab has claws, bent over from its two longitudinal edges, that are pressed against the first tab. Such an embodiment of the transverse reinforcement is economical to produce and requires no additional parts.

In an advantageous embodiment of the invention, the first tab has lateral recesses, into which the claws bent over from the second tab dip. As a result, in the transverse direction of the sheet-metal part, the claws establish an additional positive engagement between the two tabs, thus reliably preventing a relative displacement of the two tabs even if extreme shear forces occur in impeded operation of the wiper.

In an advantageous embodiment of the invention, the boundary edges oriented toward one another of the recesses are chamfered on each long side of the second tab in such a way that their inside spacing from one another decreases toward the bottom of the recesses. Because of these slightly oblique recesses embodied with a decreasing width, a play between the tabs in the transverse direction of the sheet-metal part can be compensated for when the claws are pressed against them.

In an advantageous embodiment of the invention, the sheet-metal part along with the ears and tabs is stamped out of a sheet-metal plate and is deep-drawn in order to form the side cheeks.

BRIEF DESCRIPTION OF THE DRAWINGS

The invention is described in further detail in the ensuing description in terms of an exemplary embodiment shown in the drawing. Shown in perspective are.

DETAILED DESCRIPTION OF THE PREFERRED EMBODIMENTS

Figure 1:
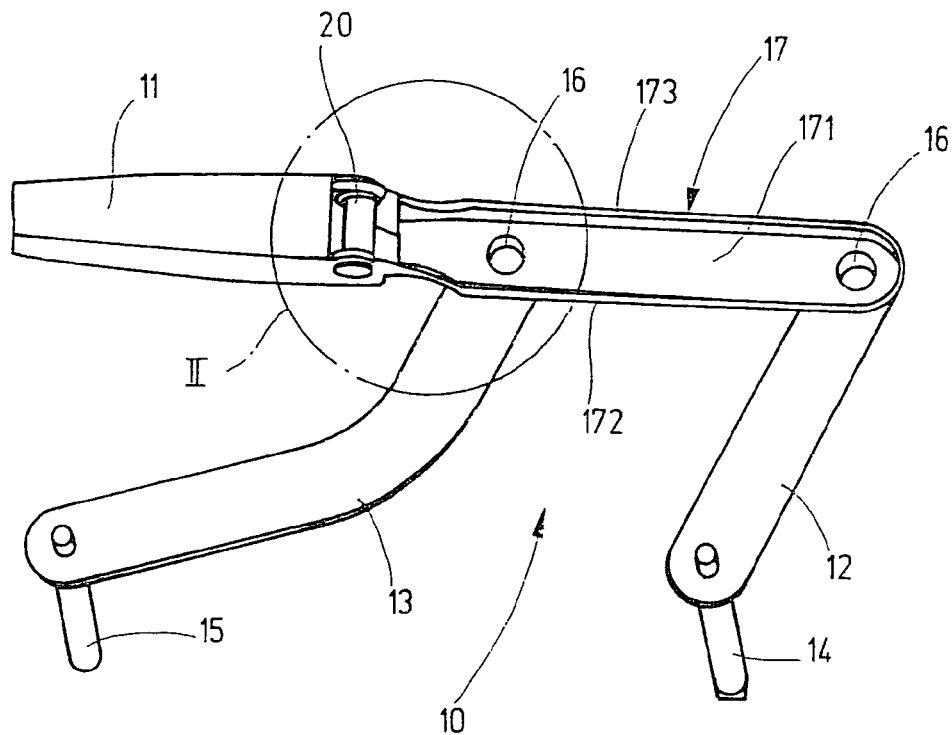
FIG. 1, in fragmentary form, a plan view on a wiper for a vehicle window with a four-bar drive linkage and with a wiper arm, shown in part.

The wiper for a vehicle window, shown in part and in perspective in FIG. 1, has a four-bar drive linkage 10 and a wiper arm 11, which is driven by this linkage to execute a reciprocating pivoting motion and which on its free end has a wiper blade, not shown here, that it moves over the vehicle window in its pivoting motion. The four-bar drive linkage 10 includes two pivot levers 12 and 13, which are each seated on one end in a manner fixed against relative rotation on a respective axle 14, 15, of which one axle can be put into a pivoting motion by means of a wiper motor, while the other axle is received in rotating fashion in a support bearing. On the ends remote from the axles, the two pivot levers 12, 13 are each joined, via a respective joint 16 whose joint axis is oriented parallel to the axles 14, 15, to a fastening part representing a coupling. The fastening part is embodied as a sheet-metal part 17, with a substantially flat back 171 located in the pivoting plane of the coupling, and with two side cheeks 172 protruding approximately at right angles from the back. The side cheeks 172, 173, opposite one another on the back 171, merge, on the end of the sheet-metal part 17 toward the wiper arm receptacle, with protruding ears 18, 19, where they form the so-called top region, in which the wiper arm 11 is pivotably connected to a joint axle oriented approximately at a right angle to the axes of the joints 16 and to the longitudinal axis of the back 171. To that end, in each of the ears 18, 19, a bore 181, 191 is provided, through which a hinge bolt 20 can be passed rotatably, which in turn is fixed to the wiper arm 11.

Figure 2:
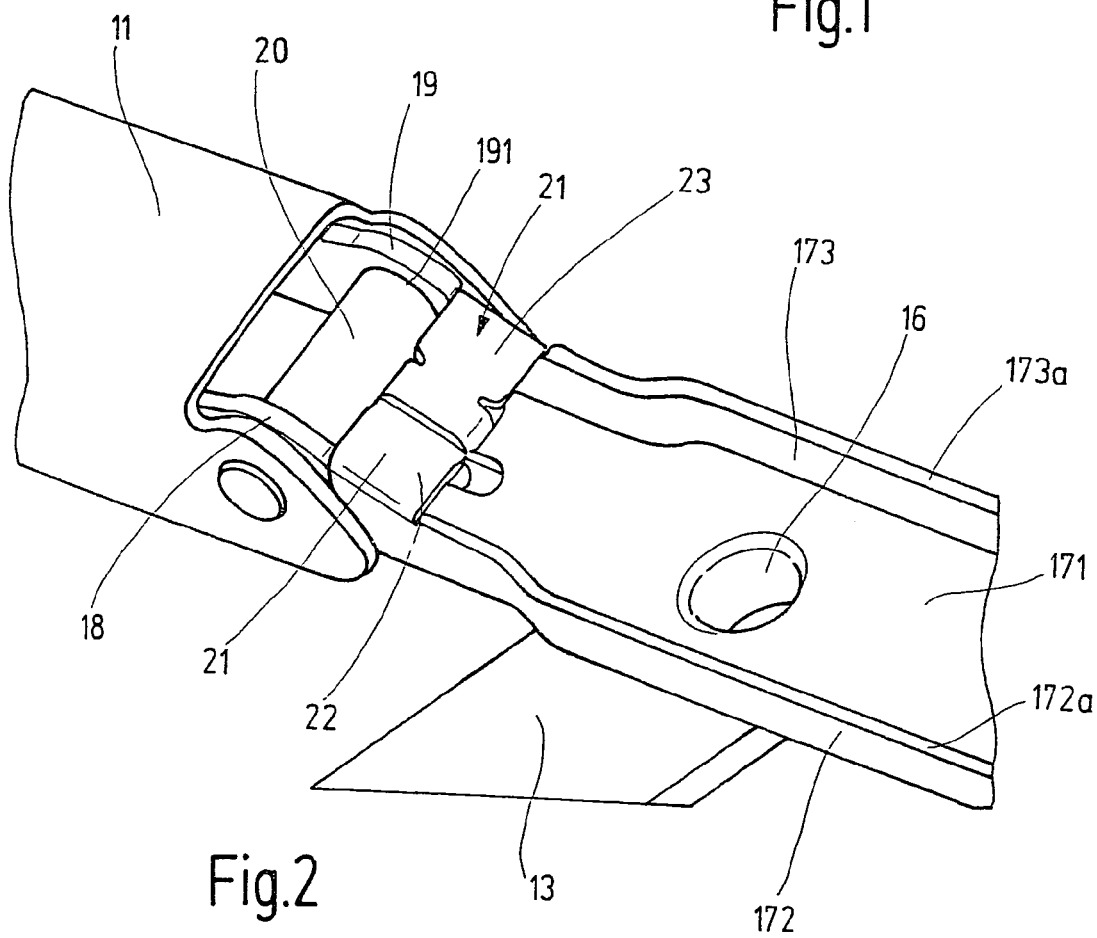
FIG. 2, an enlarged view of the detail marked II in FIG. 1.
Figure 3:
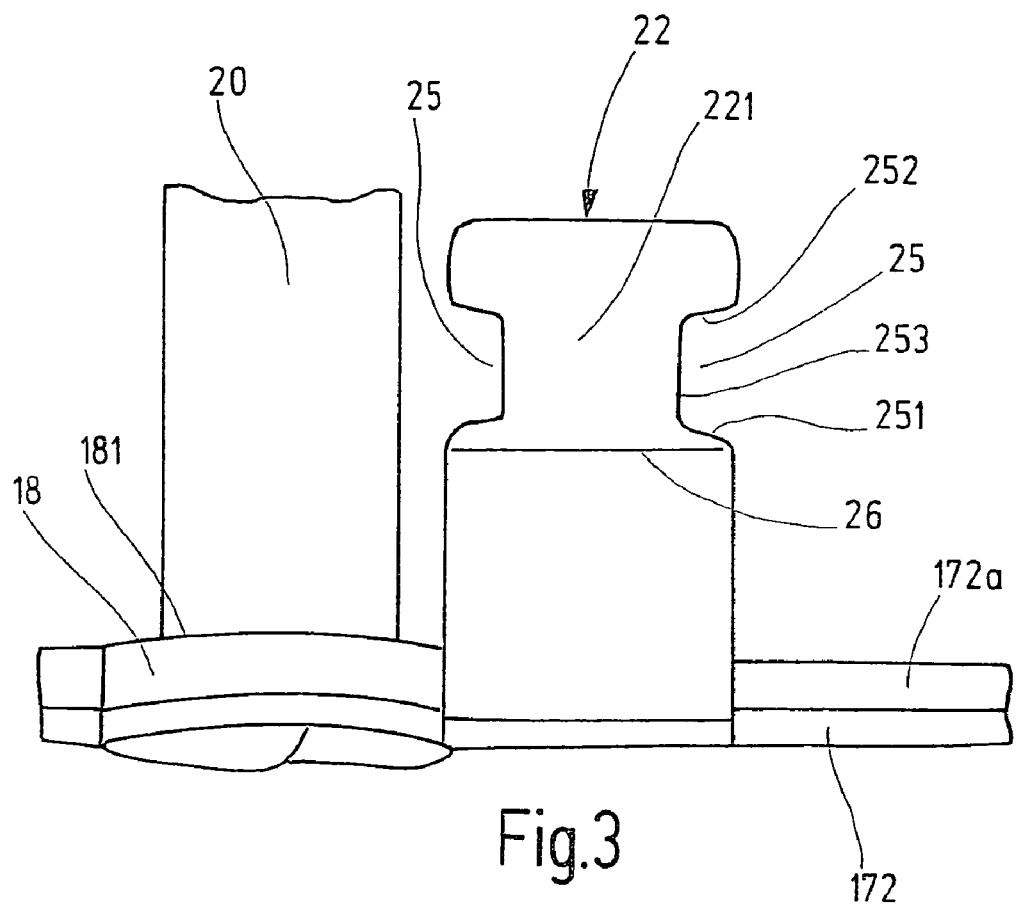
FIGS. 3 and 4, each, an enlarged view of a detail of a transverse reinforcement in the fastening part of the four-bar drive linkage of FIGS. 1 and 2.

For stiffening the top region of the sheet-metal part 17, a transverse reinforcement 21, which braces the side cheeks 172, 173 against one another, is provided in the transition region from the side cheeks 172, 173 to the ears 18, 19, between the upper edges 172a and 173a, remote from the back, of the side cheeks 172, 173. As the enlarged view in FIG. 2 shows, the transverse reinforcement 21 comprises a first tab 22, which is bent approximately at a right angle at the upper edge 172a of one side cheek 172, and which extends approximately parallel to the back 171, and a second tab 23, which is bent over at the upper edge 173a of the other side cheek 173 until it rests on the first tab 22. The second tab 23, on both of its longitudinal edges, has downward-bent claws 24 (FIG. 4), which are pressed laterally against the first tab 22. As FIG. 3 shows, the first tab 22 has lateral recesses 25, into which the claws 24 dip while the second tab 23 is being bent over onto the first tab 22. As can be seen from FIG. 3, the boundary edges 251, 252, oriented toward one another, of the recesses 25 are slightly chamfered, specifically in such a way that their inside spacing from one another decreases toward the bottom of the recess 25. By means of these chamfered recesses 25, the claws 24 on being pressed against the first tab 22 can be pressed more or less deeply into the recesses 25, so that a play in the transverse direction of the sheet-metal part 17 between the claws 24 and the recesses 25 is compensated for. The first tab 22 preferably extends to near the side cheek 173 and can furthermore have a right-angle bend 26, in such a way that its portion 221 bent at a right angle and receiving the bent-over second tab 23 is located at a deeper level, and thus the two tabs 22, 23 resting on one another are flush at the surface.

The sheet-metal part 17, with the ears 18, 19 and tabs 22, 23 and claws 24 and recesses 25, is stamped or cut out of a sheet-metal plate and deep-drawn for forming the side cheeks 172, 173, which merge integrally with one another on the end of the sheet-metal part 17 remote from the wiper arm 21.

Figure 4:
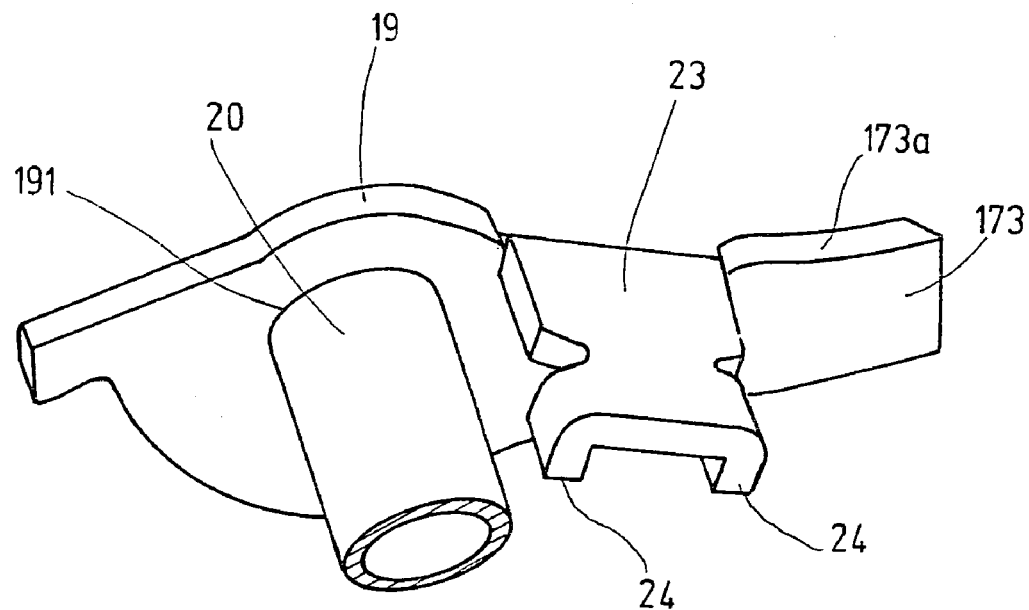

In FIGS. 3 and 4, details of the transverse reinforcement 21 are shown enlarged. FIG. 3 shows the first side cheek 172 with the ear 18 and first tab 22 and also shows the hinge bolt 20 thrust through the bore 181, and FIG. 4 shows the second side cheek 173 with the ear 19 and the second tab 23 and also shows the hinge bolt 20 thrust through the bore 191. Once the sheet-metal part 17 has been stamped out, and the ears 18, 19 have been set up, the first tab 22 is also bent over far enough that it extends approximately parallel to the back 171 of the sheet-metal part 17 (FIG. 3). At the same time, the right-angle bend 26 is made (FIG. 3). Now the second tab 23 is bent over from the side cheek 173 onto the first tab 22, until the lateral claws 24 dip into the recesses 25 in the first tab 22 (FIG. 4). Once the second tab 23 is resting on the portion 221, bent at a right angle, of the first tab 22, the claws 24 are pressed by lateral pressure into the recesses 25 and in the process are pressed against the boundary edges 251 and 252 of the recesses 25 (FIG. 2).

The invention claimed is:

1. A fastening part for a wiper arm of a vehicle wiper, which is drivable for a pivoting motion and which has a recess for an articulated connection of the wiper arm (11), characterized by a sheet-metal part (17) having an essentially flat back (171) located in the pivoting plane and two side cheeks (172, 173) protruding approximately at right angles from the flat back, which cheeks, on the end of the sheet-metal part (17) toward a wiper arm receptacle, merge with protruding ears (18, 19) that carry the receptacle, and by a transverse reinforcement (21), in the transition region from the side cheeks (172, 173) to the ears (18, 19), mat braces the upper edges (172a, 173a), remote from the back, against one another, wherein the transverse reinforcement (21) includes a first tab (22), which is bent over approximately parallel to the back (171) at the upper edge (172) of one side cheek (172), and a second tab (23), which is bent over until it rests on the first tab (22) at the upper edge (173a) of the other side cheek (173), and which second tab has claws (24), bent over from its two longitudinal edges, which claws are pressed against the first tab (22).

2. The fastening part of claim 1, wherein the first tab (22) has lateral recesses (25), in which the bent-down claws (24) on the second tab (23) dip.

3. The fastening part of claim 2, wherein the boundary edges (251, 252), oriented toward one another, of the recesses (25) are chamfered such that their spacing from one another decreases toward the bottom (253) of the recess (25).

4. The fastening part of claim 1, wherein the first tab (22) extends to near the opposite side cheek (173).

5. The fastening part of claim 1, wherein the sheet-metal part (17), with ears (18, 19), tabs (22, 23), recesses (25), and claws (24), is stamped out of a sheet-metal blank and deep-drawn for forming the side cheeks (172, 173).

* * * * *